United States Patent [19]
Lee et al.

[11] Patent Number: 5,674,924
[45] Date of Patent: Oct. 7, 1997

[54] FLAMEPROOF THERMOPLASTIC RESIN COMPOSITIONS

[75] Inventors: Kyu-Cheol Lee; Sam-Joo Yang; Bok-Nam Jang, all of Kyungki-do, Rep. of Korea

[73] Assignee: Cheil Industries Inc., Taegu, Rep. of Korea

[21] Appl. No.: 573,464

[22] Filed: Dec. 15, 1995

[30] Foreign Application Priority Data

Aug. 19, 1995 [KR] Rep. of Korea ............... 1995-25518

[51] Int. Cl.[6] ..................... C08K 5/521; C08L 55/02; C08L 69/00
[52] U.S. Cl. ..................... 523/201; 524/127; 524/140; 524/141; 524/143; 524/504; 524/546; 525/67; 525/902
[58] Field of Search .................... 504/127; 529/140; 524/141, 143, 504, 546; 523/201; 525/902; 526/67

[56] References Cited

U.S. PATENT DOCUMENTS

| | | | |
|---|---|---|---|
| 4,248,976 | 2/1981 | Clubley et al. | 525/2 |
| 4,526,917 | 7/1985 | Axelrod | 524/141 |
| 4,556,684 | 12/1985 | Gunkel et al. | 524/141 |
| 4,692,488 | 9/1987 | Kress et al. | 524/139 |
| 4,883,835 | 11/1989 | Buysch et al. | 524/504 |
| 4,914,144 | 4/1990 | Muehlbach et al. | 524/139 |
| 4,983,658 | 1/1991 | Kress et al. | 524/141 |
| 5,036,126 | 7/1991 | Rinehart et al. | 524/141 |
| 5,061,745 | 10/1991 | Wittmann et al. | 524/140 |
| 5,122,556 | 6/1992 | Kambour | 524/141 |
| 5,204,394 | 4/1993 | Gosens et al. | 524/125 |
| 5,240,978 | 8/1993 | Fuhr et al. | 524/141 |
| 5,272,193 | 12/1993 | Fuhr et al. | 524/149 |
| 5,276,078 | 1/1994 | Ogoe et al. | 524/141 |
| 5,290,836 | 3/1994 | Truyen | 524/123 |
| 5,292,786 | 3/1994 | Gaggar et al. | 514/127 |
| 5,302,646 | 4/1994 | Vilasagar et al. | 524/127 |
| 5,455,292 | 10/1995 | Kakegawa et al. | 524/127 |

FOREIGN PATENT DOCUMENTS

| | | |
|---|---|---|
| 0363608 | 4/1990 | European Pat. Off. . |
| 0521628 | 1/1993 | European Pat. Off. . |
| 59-24736 | 2/1984 | Japan . |
| 59-45351 | 3/1984 | Japan . |
| 62-4747 | 11/1987 | Japan . |

OTHER PUBLICATIONS

Bucknall, C.B., Toughened Plastics, V, 94–99, Applied Science Publishers, Ltd.

*Primary Examiner*—Peter A. Szekely
*Attorney, Agent, or Firm*—Woodcock Washburn Kurtz Mackiewicz & Norris

[57] ABSTRACT

The present invention relates to flameproof thermoplastic resin compositions comprising (A) a base resin consisting of (1) 80 to 96% by weight of a thermoplastic, halogen-free polycarbonate, and (2) 4 to 20% by weight of a core-shell type ABS resin with a graft index of 40 or above, which is obtained by grafting 25 to 45% by weight of a styrene and 10 to 15% by weight of an acrylonitrile onto 45 to 60% by weight of a butadiene rubber, (B) 5 to 20 parts by weight, per 100 parts by weight of the base resin(A), of a phosphate composition, and (C) 0.1 to 2.0 parts by weight, per 100 parts by weight of the base resin(A), of a perfluoroalkane polymer. The phosphate composition is represented as the general formula (I):

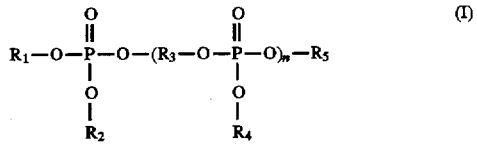

wherein $R_1$, $R_2$, $R_3$, $R_4$, and $R_5$ independently of one another are $C_6$–$C_{20}$ aryl or alkyl-substituted $C_6$–$C_{20}$ aryl, n is 0 to 5, and the average n of the phosphate composition is, n is 0 to 5, about 0.3 to 0.8.

3 Claims, 6 Drawing Sheets

5,674,924

FLAMEPROOF THERMOPLASTIC RESIN COMPOSITIONS

FIELD OF THE INVENTION

The present invention relates to flameproof thermoplastic resin compositions, and specifically to those for molding, comprising a base resin consisting of a halogen-free polycarbonate and a core-shell type ABS(acrylonitrile/butadiene/styrene) polymer, a phosphate composition, and a perfluoroalkane polymer. The thermoplastic resin compositions of the present invention may further contain additives such as inorganic fillers, heat stabilizers, dyes, or pigments in fractions as needed.

BACKGROUND OF THE INVENTION

Polycarbonate molding compositions are widely used for parts of automobiles and electrical appliances. They have a good combination of transparency, high impact strength, and heat resistance. However, polycarbonate molding compositions do not have good processability during molding process, so other resins are used with the polycarbonate resin. For example, a molding composition comprising a polycarbonate resin and a styrenic resin has good processability as well as high notched impact strength.

Furthermore, polycarbonate molding composition used for housing materials of home appliances and computers should be flame resistant to prevent fires. For this purpose, halogen and/or antimony containing-compounds have been used to render flame retardency to thermoplastic molding compositions. In U.S. Pat. Nos. 4,983,658 and 4,883,835, a halogen-containing compound is used as flame-retardant. The halogen-containing compound, however, results in the corrosion of the mold itself by the hydrogen halide gases released during a molding process and is fatally harmful due to the toxic gases liberated in the case of fire.

U.S. Pat. No. 4,692,488 discloses a thermoplastic molding composition comprising a halogen-free aromatic polycarbonate, a halogen-free thermoplastic copolymer of styrene and acrylonitrile, a halogen-free phosphorus compound, a tetrafluoroethylene polymer, and graft polymers of ABS. The use of a phosphorus compound and a perfluoroalkane polymer to render flame retardency to a polycarbonate/ABS resin composition, as disclosed in U.S. Pat. No. 4,692,488, prevents the dripping of flaming particles during combustion. Though the resin composition results in satisfactory flame retardency, unsatisfactory surface crack due to the flame retardant migration during a molding process, called "juicing", might occur, thus degrading the physical properties of the resin composition. In order to prevent the juicing phenomenon, an oligomeric phosphate is used in the preparation of a polycarbonate/ABS resin composition, as disclosed in U.S. Pat. No. 5,204,394. U.S. Pat. No. 5,204,394 discloses a polymer mixture comprising an aromatic polycarbonate, a styrene-containing copolymer and/or styrene-containing graft copolymer, and an oligomeric phosphate or a blend of oligomeric phosphates as flame retardant.

In the U.S. Patents mentioned above, representative examples of the phosphorus compound are triarylphosphates and oligomeric phosphates. In the process of using triarylphosphates, a juicing phenomenon occurs during molding processes because the triarylphosphates form laminae on the surface to which a strong stress is applied, and the heat resistance of the resin composition deteriorates. On the other hand, in processes using oligomeric phosphates, a juicing phenomenon may not occur, but the appearance of molded articles is not good (i.e., the articles have color stripes). In addition, when oligomeric phosphates add to a resin with the same content as triarylphosphate, the flame retardency of oligomeric phosphates is inferior to that of triarylphosphate.

In the case of using a base resin comprising a polycarbonate, a styrene-containing graft copolymer, and a styrene-containing copolymer in the resin composition, the present inventors have found that the particles of the styrene-containing copolymer agglomerate with the particles of the styrene-containing graft copolymer. It is believed that the styrene-containing copolymer does not have good compatibility with the styrene-containing graft copolymer. In the resin composition, the particles of the styrene-containing graft copolymer are not evenly distributed, thereby causing an agglomeration. This phenomenon cannot provide a resin composition with favorable physical properties, in particular, the physical properties of the resin composition deteriorate during a molding process.

Accordingly, the present inventors developed a new thermoplastic resin composition with a good combination of heat resistance, no juicing phenomenon, good processability, appearance, and flame retardency, comprising a base resin consisting of a polycarbonate and a styrene-containing graft copolymer, a phosphate composition, and a perfluoroalkane polymer, and filed a patent application (Korean Patent Application No. 95-4542: Corresponding U.S. Ser. No. 08/449,521).

The present inventors also developed another new thermoplastic resin composition comprising a base resin consisting of a polycarbonate and a styrene-containing graft copolymer, a phosphate composition, and a perfluoroalkane polymer. The styrene-containing graft copolymer is obtained by grafting methyl methacrylate, butyl acrylate and styrene onto butadiene rubber. The new thermoplastic resin composition was filed as a Korean Patent Application No. 95-24618.

For the same purposes as in the above Korean Patent Applications, the present inventors have further developed a new resin composition comprising a base resin consisting of a halogen-free polycarbonate and a core-shell type ABS (acrylonitrile/butadiene/styrene) resin, a phosphate composition, and a perfluoroalkane polymer.

OBJECTS OF THE INVENTION

An object of the present invention is to provide a flameproof thermoplastic resin composition with a good combination of heat resistance, no juicing phenomenon, processability, appearance, and flame retardency which comprises a base resin consisting of a halogen-free polycarbonate and a core-shell type ABS resin, a phosphate composition, and a perfluoroalkane polymer.

Another object of the invention is to provide a flameproof thermoplastic resin composition whose particles are evenly dispersed without causing agglomeration with the change of processing conditions, which comprises a base resin consisting of a halogen-free polycarbonate and a core-shell type ABS resin, a phosphate composition, and a perfluoroalkane polymer.

A further object of the present invention is to provide a flameproof thermoplastic resin composition whose molded articles have a good impact strength independently of thickness of the articles.

SUMMARY OF THE INVENTION

The present invention relates to flameproof thermoplastic resin compositions comprising (A) a base resin consisting of (1) 80 to 96% by weight of a thermoplastic, halogen-free polycarbonate, and (2) 4 to 20% by weight of a core-shell type ABS resin with a graft index of 40 or above, which is obtained by grafting 25 to 45% by weight of a styrene and 10 to 15% by weight of an acrylonitrile onto 45 to 60% by weight of a butadiene rubber, (B) 5 to 20 parts by weight, per 100 parts by weight of the base resin(A), of a phosphate compound, and (C) 0.1 to 2.0 parts by weight, per 100 parts by weight of the base resin(A), of a perfluoroalkane polymer. The oligomeric triarylphosphate is represented as the general formula (I):

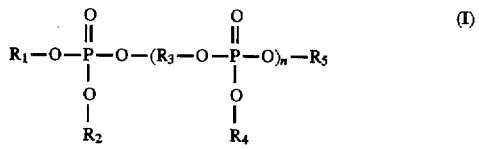

wherein $R_1$, $R_2$, $R_3$, $R_4$, and $R_5$ independently of one another are $C_6$–$C_{20}$ aryl or alkyl-substituted $C_6$–$C_{20}$ aryl and n is 0 to 5, and wherein the average n of the phosphate composition is in the range of 0.3 to 0.8.

BRIEF DESCRIPTION OF THE DRAWINGS

The photomicrographs depicted in FIGS. 1–6 were taken for the ¼" specimens.

DETAILED DESCRIPTION OF THE INVENTION

Figure 1:
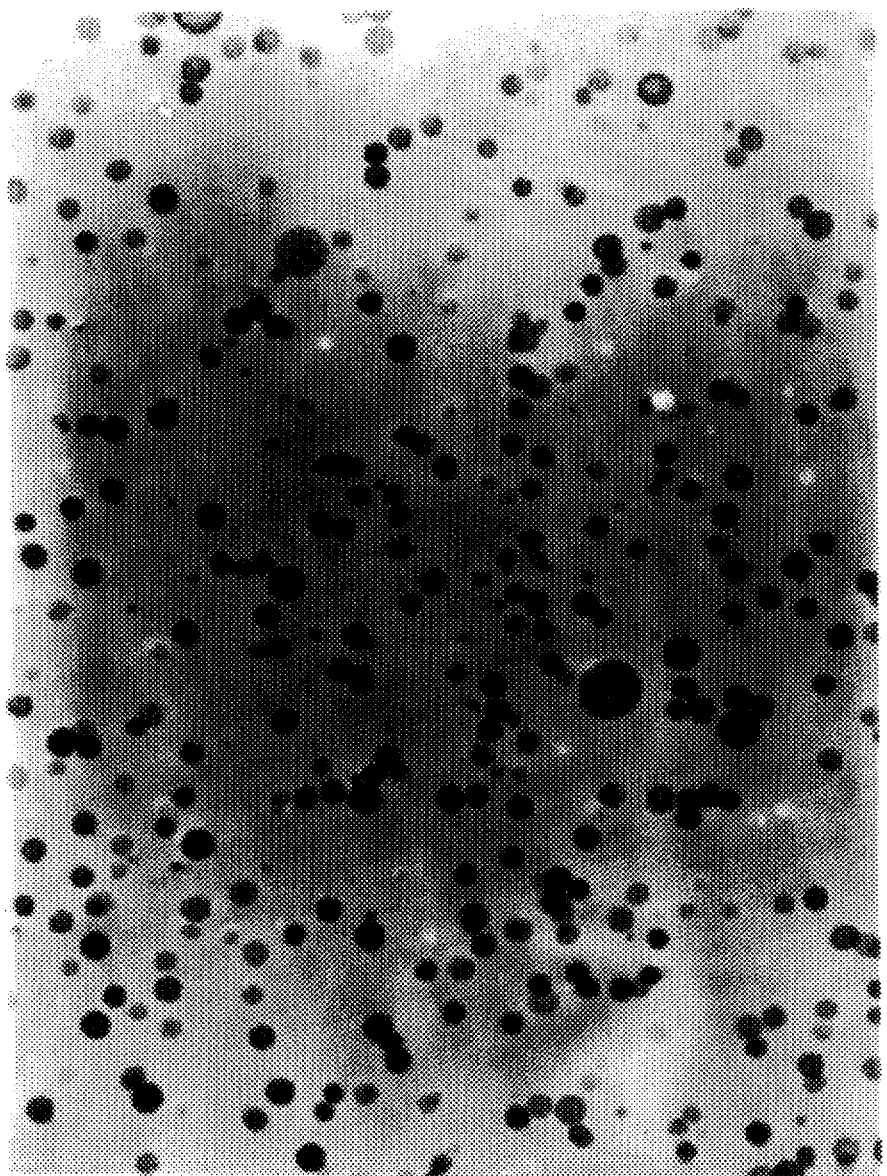
FIG. 1 represents a transmission electron microphotograph of a resin composition of Example 1 according to this invention.

The flameproof thermoplastic resin compositions according to the invention comprise a base resin(A), a phosphate composition(B), and a perfluoroalkane polymer(C). The detailed descriptions of each component follows.

(A) Base Resin

The base resin used in this invention is a blend of a thermoplastic, halogen-free polycarbonate and a core-shell type ABS resin. More particularly, the base resin consists of 80 to 96% by weight of a thermoplastic, halogen-free polycarbonate and 4 to 20% by weight of a core-shell type ABS resin.

According to substituted groups of the polycarbonate, there are aromatic polycarbonates, aliphatic polycarbonates, and aromatic/aliphatic polycarbonates, and a polycarbonate, or a blend of the polycarbonates may be used in this invention. Aromatic polycarbonates are preferable, and aromatic polycarbonates synthesized from 2,2'-bis(4-hydroxylphenyl) propane, called "Bisphenol A", are preferred.

There are two types of styrene-containing graft copolymers, a hemisphere type copolymer and a core-shell type copolymer, depending on the shell structure of the copolymer. In this invention, the present inventors have discovered that the resin composition containing a core-shell type ABS resin has superior properties to the resin composition containing a hemisphere type ABS resin. The resin compositions of the invention exhibit superior heat stability, juicing phenomenon, processability, appearance, flame retardency, and agglomeration of particles.

In a process for preparing a hemisphere type or core-shell type styrene-containing graft copolymer including an ABS resin, a conventional polymerization process may be employed by an ordinary person skilled in the art. An emulsion polymerization process may preferably be employed to prepare a core-shell type ABS resin of this invention.

The core-shell type ABS resin is obtained by grafting 25 to 45% by weight of a styrene and 10 to 15% by weight of an acrylonitrile onto 45 to 60% by weight of a butadiene rubber. In this invention, it is preferable that the core-shell type ABS resin have a graft index of 40 or above, and a gel content of 70% by weight or above, when the ABS resin is dissolved in acetone. In order to avoid agglomeration of particles, the base resin of the present invention should not contain a SAN (styrene/acrylonitrile) resin.

The base resin of the invention consists of 80 to 96% by weight of a thermoplastic, halogen-free polycarbonate and 4 to 20% by weight of a core-shell type ABS resin. If the amount of the polycarbonate is less than 80% by weight, the resin composition has poor flame retardency. On the other hand, if the amount of the polycarbonate is in excess of 96% by weight, the resin composition has poor impact strength.

(B) Phosphate Composition

The phosphate composition used in this invention is represented by the general formula (I):

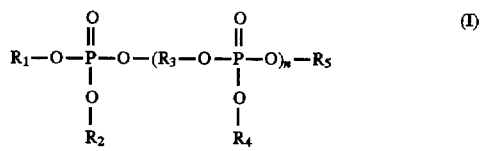

wherein $R_1$, $R_2$, $R_3$, $R_4$, and $R_5$ independently of one another are $C_6$–$C_{20}$ aryl or alkyl-substituted $C_6$–$C_{20}$ aryl and n is 0 to 5, and wherein the average n of the phosphate composition is about 0.3 to about 0.8.

The average n of the phosphate composition should be in the range of 0.3 to 0.8. Thus, the phosphate composition is a blend of the phosphates represented by the general formula (I), wherein n is 0, 1, 2, 3, 4, or 5. Where n is 0, the phosphate compositions are monomeric triaryl-phosphates, and where n is 1, 2, 3, 4, or 5, the phosphate compositions are oligomeric triarylphosphates.

The monomeric triarylphosphates are phosphates where n is 0 in the general formula (I). Examples of triarylphosphates are triphenylphosphate, tri(2,6-dimethylphenyl)phosphate, tri(4-methyl-phenyl)phosphate, tricresylphosphate, diphenyl 2-ethylcresylphosphate, diphenylcresylphosphate, tri(isopropylphenyl)phosphate, trixylenylphosphate, xylenyldiphenylphosphate, etc.

When only monomeric triarylphosphates with n=0 are used in a resin composition, a juicing problem might appear during molding processes, because the monomeric triarylphosphates are volatile at about 200° C. or above. If a blend of phosphates with an average n of 1.2 or above is used in a resin composition, a juicing problem can be improved, but the flame retardency and physical properties of the resin deteriorate. The phosphates with an average n from 0.3 to 0.8 may be preferably used in this invention so as to improve the physical properties as well as flame retardency of the resin compositions.

For the phosphate compositions to have an average n from 0.3 to 0.8, the phosphate compositions consist of 30 to 60% by weight of monomeric triarylphosphates and 40 to 70% by weight of triarylphosphates.

Synthetic oligomeric triarylphosphates may also be used in this invention, in which the average n of the synthetic oligomeric triarylphosphates is 0.3 to 0.8. Synthetic oligomeric triarylphosphates are prepared by adding phenol, resorcinol, and dichloromagnesium to benzene, heating the solution, and dropping trichlorophosphinoxide in the solution. The synthetic oligomeric triarylphosphate with an average n of 0.3 to 0.8 is extracted from the resultant solution. The phosphate composition is used in an amount of 5 to 20 parts by weight per 100 parts by weight of the base resin.

(C) Perfluoroalkane Polymer

The flameproof thermoplastic resin compositions according to the present invention include a perfluoroalkane polymer. Examples of perfluoroalkane polymers are polytetrafluoroethylene, polyvinylidene fluoride, copolymer of polytetrafluoroethylene and polyvinylidenefluoride, copolymer of tetrafluoroethylene and fluoroalkylvinylether, and copolymer of tetrafluoroethylene and hexafluoropropylene. At least one of the perfluoroalkane polymers may be used in the flameproof thermoplastic resin compositions. The perfluoroalkane polymer decreases the melting flow of the flameproof thermoplastic resin during combustion by forming a fibrillar network in the resin and increases the shrinkage of the resin, thereby preventing the dripping of the melting resin during combustion. The perfluoroalkane polymer may be preferably used in a form of powder so as to disperse and blend evenly in a flameproof thermoplastic resin composition. Polytetrafluoroethylene with a particle size of 20 to 500μ is conventionally available for this invention. 0.1 to 2.0 parts by weight of a perfluoroalkane polymer per 100 parts by weight of the base resin is blended.

The flameproof thermoplastic resin compositions may further include additives such as inorganic fillers, heat stabilizers, oxidation inhibitors, light stabilizers, pigments and/or dyes depending on specific applications. Examples of inorganic fillers are asbestos, glass fiber, talc, or ceramic. Other additives are conventionally available to a skilled person in this technical field and may be used in this invention. The additives may be blended in a resin composition with an amount up to about 30 parts by weight per 100 parts by weight of the base resin.

The flameproof thermoplastic resin compositions are prepared by blending a base resin, a phosphate composition, and a perfluoroalkane polymer with a conventional mixer. An additive may be included in the blend. The flameproof thermoplastic resin compositions are prepared in pellet form by extruding the blend with a conventional extruder.

The flameproof thermoplastic resin compositions have effects that the compositions prevent toxic gases during combustion, and have a good combination of heat resistance, no juicing phenomenon, processability, appearance, flame retardency, and good agglomeration properties.

According to transmission electron microphotographs, the resin compositions of the present invention show even dispersion of particles without causing agglomeration.

The invention may be better understood by reference to the following examples that are intended for the purpose of illustration and are not to be construed as in any way limiting the scope of the present invention, which is defined in the claims appended hereto.

EXAMPLES

The components to prepare flameproof thermoplastic resin compositions in Examples 1–3 and Comparative Examples 1–4 are as follow:

(A) Base Resin (1) Polycarbonate: L-1225L Grade of Teijin, Inc. of Japan was used.

(2) Core-shell Type ABS Resin 50 parts by weight of butadiene latex powder, 12 parts by weight of styrene, 4 parts by weight of acrylonitrile, and 150 parts by weight of deionized water were blended, and 1.0 parts by weight of rosin soap, 0.2 parts by weight of tetrasodium pyrophosphate, 0.4 parts by weight of glucose, 0.006 parts by weight of ferrous sulfate, 0.25 parts by weight of cumenhydroperoxide, and 0.2 parts by weight of tertiarydodecylmercaptan were added to the blended solution. The resultant solution was kept at 75° C. for 1 hour. 26 parts by weight of styrene, 8 parts by weight of acrylonitrile, 0.25 parts by weight of peroxide and 0.2 parts by weight of tertiarydodecylmercaptan were added to the blended solution over 3 hours to prepare a core-shell type ABS graft polymer. 1% $H_2SO_4$ was added to the core-shell type ABS graft polymer latex to yield a core-shell type ABS resin in powder form.

(3) Hemisphere Type ABS Resin 50 parts by weight of butadiene latex powder, 36 parts by weight of styrene, 14 parts by weight of acrylonitrile, and 150 parts by weight of deionized water were blended, and 1.0 parts by weight of potassium oleate, 0.4 parts by weight of cumenhydroperoxide, and 0.3 parts by weight of a grafting reagent were added to the blended solution. The resultant solution was kept at 75° C. for 5 hours to prepare a styrene-containing graft copolymer. 0.3 parts by weight of $H_2SO_4$ was added to the styrene-containing graft copolymer to prepare hemisphere type ABS resin in powder form.

(4) SAN Copolymer 70 parts by weight of styrene, 30 parts by weight of acrylonitrile and 120 parts by weight of deionized water were blended, and 0.2 parts by weight of azobisisobutylonitrile and 0.5 parts by weight of tricalciumphosphate were added to the blended solution. Styrene-containing copolymer was prepared by suspension polymerization by washing, dehydrating, and drying the resultant product. Styrene-containing copolymer in powder form was obtained.

(B) Phosphate Composition

Triphenylphosphate(n=0): a triphenylphosphate of Daihachi Co., of Japan was used.

Oligomeric phosphate(n=1.4): CR-733S of Daihachi Co., of Japan was used.

Synthetic oligomeric phosphate: 114.7 g of phenol, 220 g of resorcinol, and 0.2 g of dichloromagnesium were added to 100 mg of benzene. The solution was heated to 70° C. 82.8 g of trichlorophosphinoxide was dropped in the solution over 2 hours at the temperature of 70° C. The resultant solution was stirred at 120° C. over 3 hours not to release hydrogen chloride gas any more. The solvent and impurities were extracted from the solution so as to prepare synthetic oligomeric phosphate in liquid at room temperature with a melting point of −10° C. and with an n of 0.6 in the general formula (I).

(c) Perfluoroalkane Polymer

Teflon(trademark) 7AJ of Dupont, Inc. of U.S.A. was used.

EXAMPLES 1–2 and Comparative Examples 1–6

The compositions of each component used in Examples 1–2 and Comparative Examples 1–6 are shown in Table 1. Neither a hemisphere type ABS nor a SAN was used in Examples 1–2, but a hemisphere type ABS only was used in Comparative Examples 1–2, and both a hemisphere type ABS and a SAN were used in Comparative Examples 3–6.

In the Examples and Comparative Examples, the flameproof thermoplastic resin compositions were extruded in pellet form. And the resin pellets were molded into test specimens.

TABLE 1

|  | | Examples | | Comparative Examples | | | | | |
|---|---|---|---|---|---|---|---|---|---|
|  | | 1 | 2 | 1 | 2 | 3 | 4 | 5 | 6 |
| (A) | (1) Polycarbonate | 90 | 90 | 90 | 90 | 90 | 90 | 90 | 90 |
|  | (2) Core-shell type ABS | 10 | 10 | — | — | — | — | — | — |
|  | (3) Hemisphere type ABS | — | — | 10 | 10 | 6 | 6 | 6 | 6 |
|  | (4) SAN copolymer | — | — | — | — | 4 | 4 | 4 | 4 |
| (B) | Triphenylphosphate(n = 0) | — | — | — | — | — | — | 9 | 9 |
|  | Oligomeric phosphate (n = 1.4) | — | — | — | — | 9 | 9 | — | — |
|  | Oligomeric phosphate (n = 0.6) | 9 | 9 | 9 | 9 | — | — | — | — |
| (C) | Perfluoroalkane polymer | 0.7 | 0.7 | 0.7 | 0.7 | 0.7 | 0.7 | 0.7 | 0.7 |
|  | Molding Temperature (°C.) | 240 | 270 | 240 | 270 | 240 | 270 | 240 | 270 |

All numerals except the molding temperatures are in grams.

For the test specimens according to the Examples and Comparative Examples, flame retardency, impact strength, and heat resistance were measured, and juicing phenomenon and agglomeration were observed. The test results are shown in Table 2. FIGS. 1–6 represent transmission electron microphotographs of resin compositions of Examples 1–2 and Comparative Examples 1–4. Examples 1–2 do not show agglomeration of the particles of the resin composition. Comparative Examples 3–4 show agglomeration. It is believed that the ABS resin agglomerates with the SAN resin. Comparative Example 1 shows even distribution not agglomerating grafted rubber particles, but Comparative Example 2 shows agglomeration of the rubber particles. It is believed that the agglomeration depends on the conditions of a molding process, for example, molding temperature. In this application, transmission electron microphotographs for Comparative Examples 5–6 are not attached. However, it appeared that the agglomeration for Comparative Examples 5–6 depended on the thickness of a molded article and the molding condition.

TABLE 2

Figure 2:
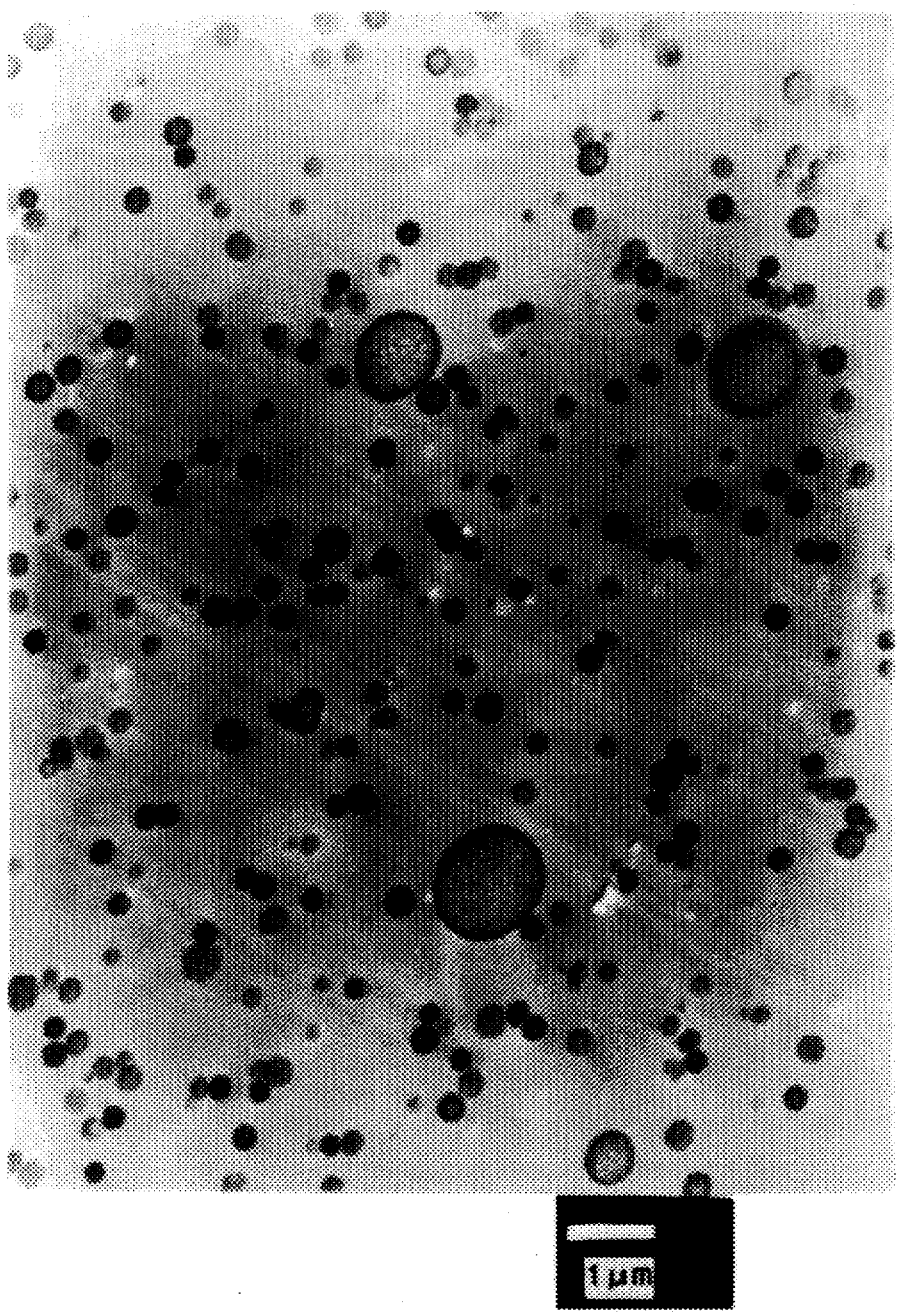
FIG. 2 represents a transmission electron microphotograph of a resin composition of Example 2 according to this invention.
Figure 3:
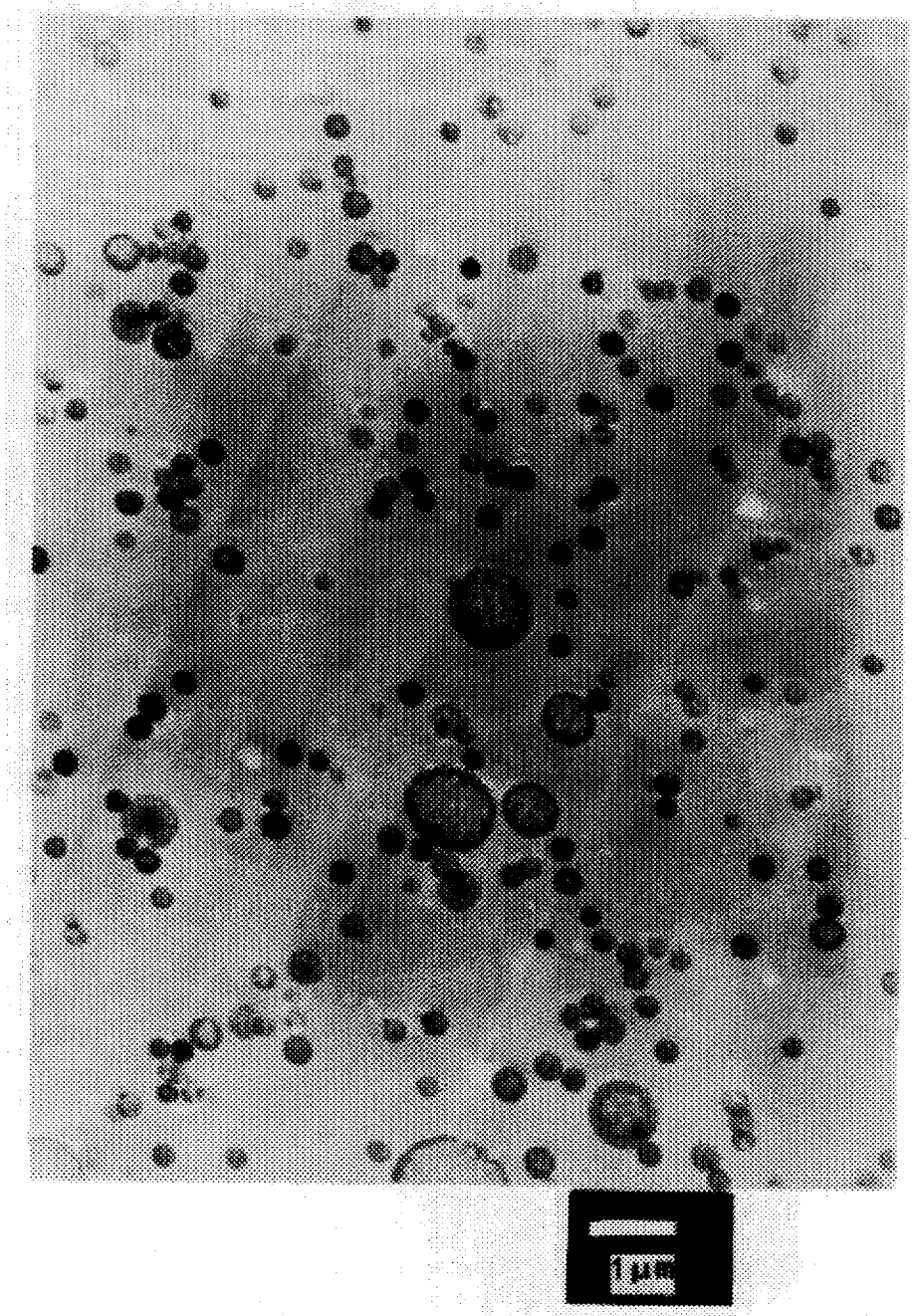
FIG. 3 represents a transmission electron microphotograph of a resin composition of Comparative Example 1 according to this invention.
Figure 4:
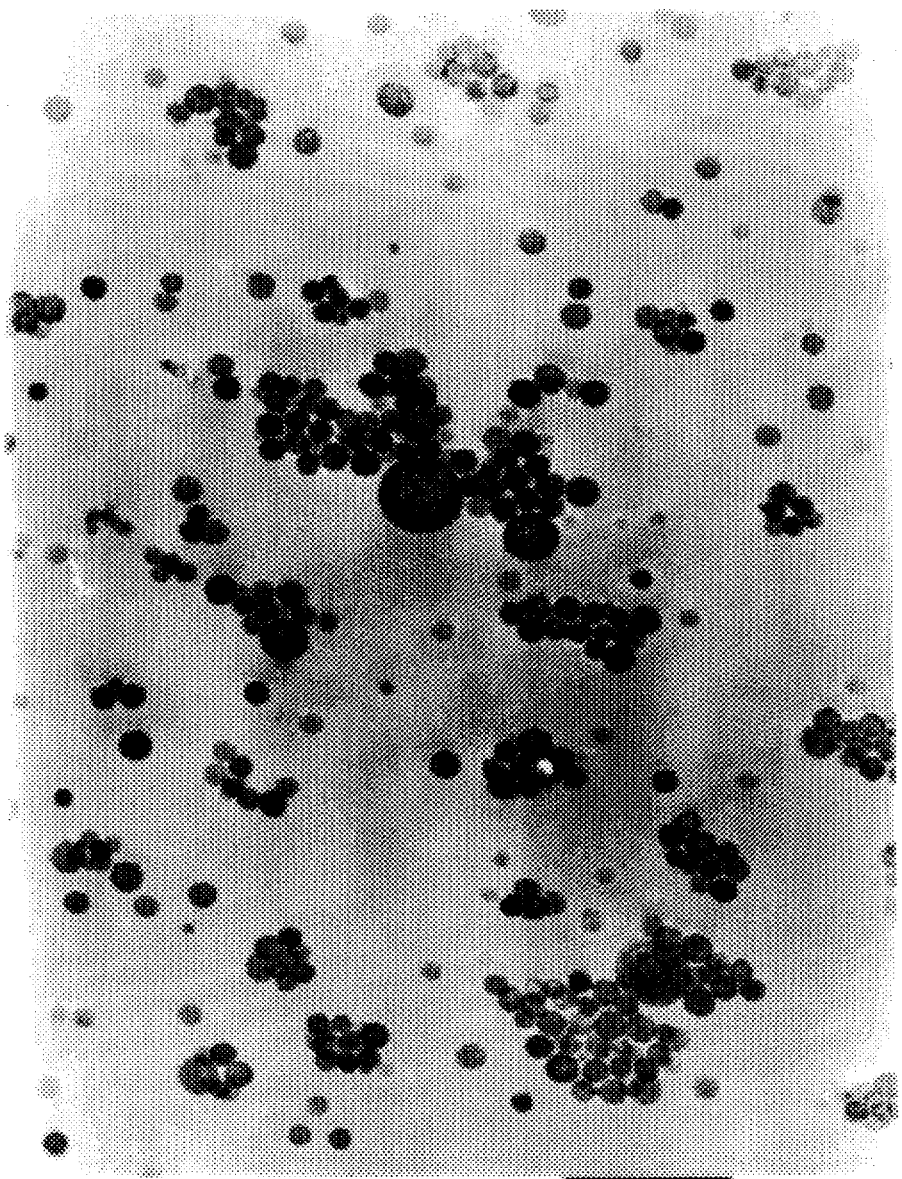
FIG. 4 represents a transmission electron microphotograph of a resin composition of Comparative Example 2 according to this invention.
Figure 5:
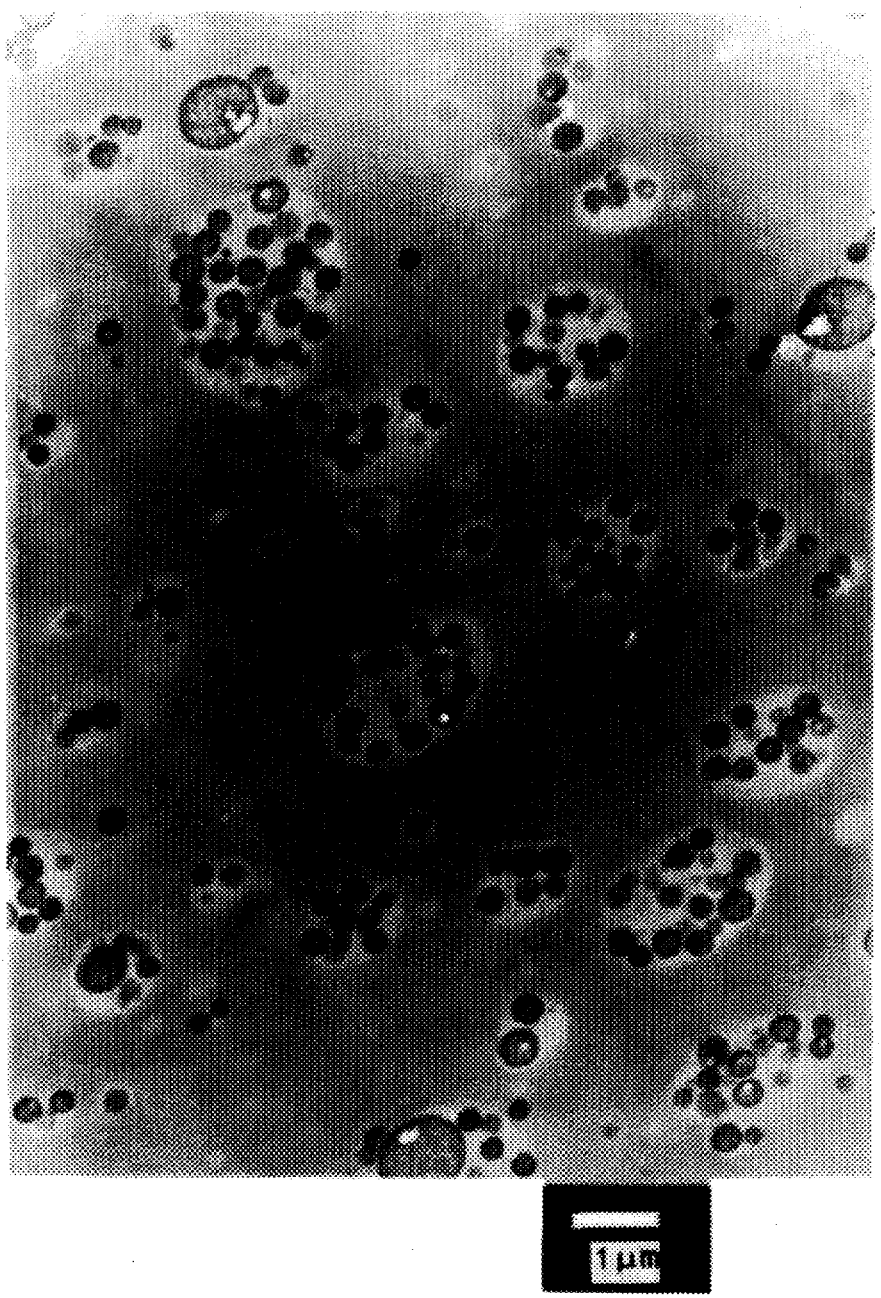
FIG. 5 represents a transmission electron microphotograph of a resin composition of Comparative Example 3 according to this invention.
Figure 6:
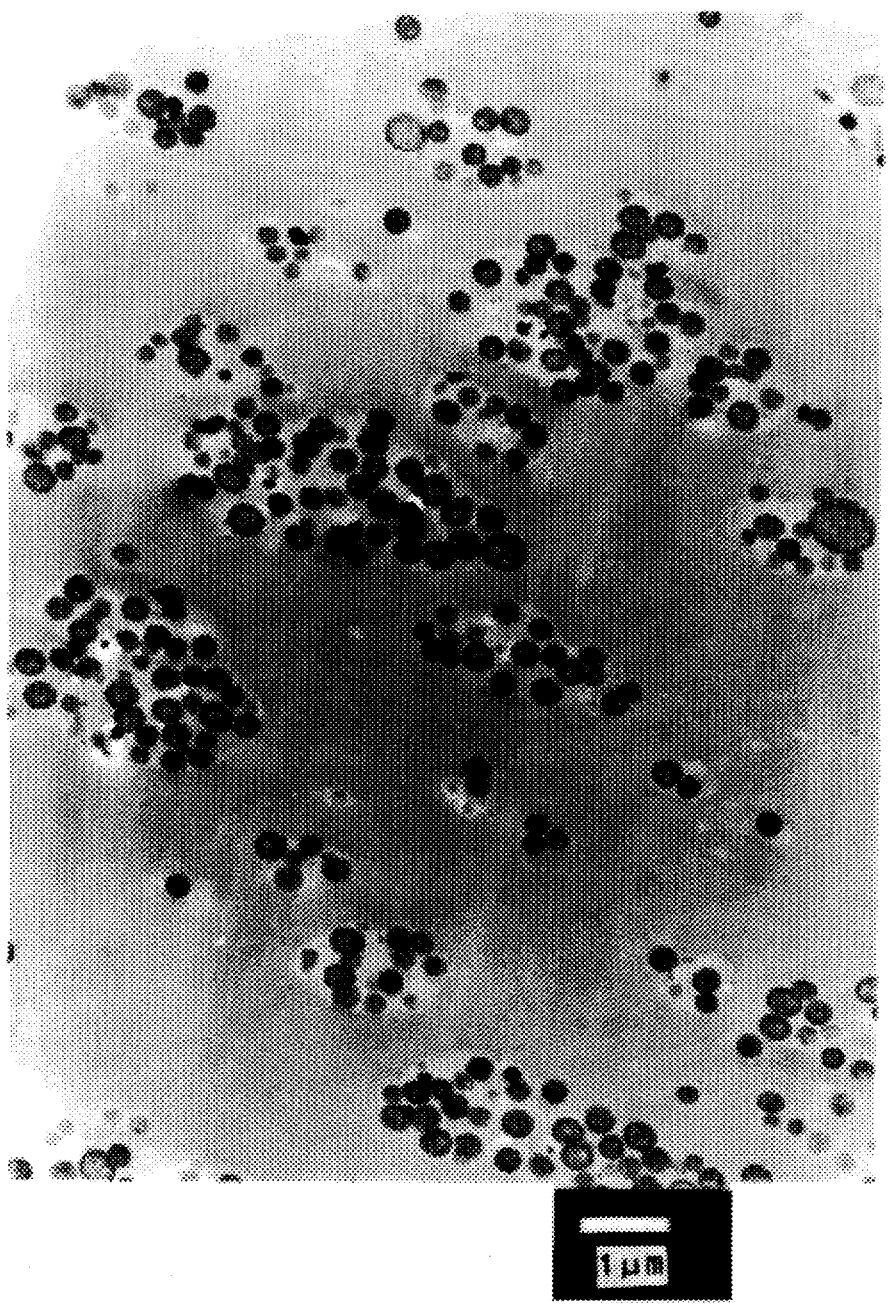
FIG. 6 represents a transmission electron microphotograph of a resin composition of Comparative Example 4 according to this invention.

|  | Examples | | Comparative Examples | | | | | |
|---|---|---|---|---|---|---|---|---|
|  | 1 | 2 | 1 | 2 | 3 | 4 | 5 | 6 |
| UL 94 (1/16") | V-0 | V-0 | V-0 | V-0 | V-1 | V-1 | V-0 | V-0 |
| Impact Strength (1/4")² | 33 | 34 | 34 | 16 | 12 | 11 | 36 | 19 |
| Impact Strength (1/8")² | 62 | 60 | 60 | 55 | 47 | 19 | 62 | 54 |
| Heat Stability (VST)³ | 105 | — | 104 | — | 108 | — | 102 | — |
| Juicing⁴ | X | X | X | X | X | X | O | O |
| Agglomeration⁵ | X | X | X | Δ | Δ | O | X | Δ |
|  | FIG. 1 | FIG. 2 | FIG. 3 | FIG. 4 | FIG. 5 | FIG. 6 | | |

Notes)
[1]UL94(1/16") was tested according to UL 94 VB.
[2]Impact strength (kgf · cm/cm) was tested according to ASTM D256.
[3]Heat stability was tested according to ASTM D306.
[4]Juicing was observed with an optical microscope, after the specimens were kept at 80° C. for 24 hours. (X: Juicing was not observed, O: Juicing was observed, Δ: Juicing was observed depending on the molding condition).

TABLE 2-continued

|  | Examples | | Comparative Examples | | | | | |
|---|---|---|---|---|---|---|---|---|
|  | 1 | 2 | 1 | 2 | 3 | 4 | 5 | 6 |

[5]Agglomeration was observed with a transmission electron microscope. (X: Agglomeration was not observed, O: Agglomeration was observed, Δ: Agglomeration was observed depending on the molding condition and thickness of an molded article).

What is claimed is:

1. A flameproof thermoplastic resin composition consisting of:

(A) a base resin consisting of (1) 80 to 96% by weight of a thermoplastic, halogen-free polycarbonate, and (2) 20 to 4% by weight of a core-shell acrylonitrile/butadiene/styrene graft copolymer having a graft index of at least 40, wherein said acrylonitrile/butadiene/styrene graft copolymer is made by grafting 25 to 45% by weight of a styrene and 10 to 15% by weight of an acrylonitrile onto 45 to 60% by weight of a butadiene rubber;

(B) 5 to 20 parts by weight, per 100 parts by weight of the base resin(A), of a phosphate composition consisting of 30 to 60% by weight of monomeric triarylphosphates and 70 to 40% by weight of oligomeric triarylphosphates of the general formula:

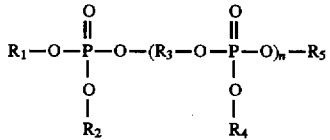

wherein $R_1$, $R_2$, $R_3$, $R_4$, and $R_5$ independently of one another are $C_6$–$C_{20}$ aryl or alkyl-substituted $C_6$–$C_{20}$ aryl, and n is 0 to 5, and wherein the average n of the phosphate composition is about 0.3 to 0.8; and Ⓒ 0.1 to 2.0 parts by weight, per 100 parts by weight of the base resin(A), of a perfluoroalkane polymer.

2. The thermoplastic resin composition of claim 1 wherein said perfluoroalkane polymer is selected from the group consisting of polytetrafluoroethylene, polyvinylidenefluoride, copolymer of tetrafluoroethylene and vinylidenefluoride, copolymer of tetrafluoroethylene and fluoroalkylvinylether, and copolymer of tetrafluoroethylene and hexafluoropropylene.

3. A flameproof thermoplastic resin composition consisting of:

(a) a base resin consisting of (1) 80 to 9.6% by weight of a thermoplastic, halogen-free polycarbonate, and (2) 20 to 4% by weight of a core-shell acrylonitrile/butadiene/styrene graft copolymer having a graft index of at least 40, wherein said acrylonitrile/butadiene/styrene graft copolymer is made by grafting 25 to 45% by weight of a styrene and 10 to 15% by weight of an acrylonitrile onto 45 to 60% by weight of a butadiene rubber;

(b) 5 to 20 parts by weight, per 100 parts by weight of the base resin(A), of a phosphate composition consisting of 30 to 60% by weight of monomeric triarylphosphates and 70 to 40% by weight of oligomeric triarylphosphates of the general formula:

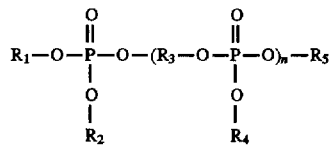

wherein $R_1$, $R_2$, $R_3$, $R_4$, and $R_5$ independently of one another are $C_8-C_{20}$ aryl or alkyl-substituted $C_8-C_{20}$ aryl, and n is 0 to 5, and wherein the average n of the phosphate composition is about 0.3 to 0.8;

(c) 0.1 to 2.0 parts by weight, per 100 parts by weight of the base resin(A), of a perfluoroalkane polymer; and (d) an additive selected from the group consisting of inorganic fillers, heat stabilizers, oxidation inhibitors, light stabilizers, pigments, dyes, and combinations thereof.

* * * * *

UNITED STATES PATENT AND TRADEMARK OFFICE
CERTIFICATE OF CORRECTION

PATENT NO. : 5,674,924
DATED : October 7, 1997
INVENTOR(S) : Kyu-Cheol Lee; Sam-Joo Yang; and Bok-Nam Jang It is certified that error appears in the above-indentified patent and that said Letters Patent is hereby corrected as shown below:

Column 10, line 10; first occurrence of $C_8$-$C_{20}$ should read -- $C_6$-$C_{20}$ --

Column 10, line 10; second occurrence of $C_8$-$C_{20}$ should read -- $C_6$-$C_{20}$ --

Signed and Sealed this

Third Day of March, 1998

Attest:

BRUCE LEHMAN

Attesting Officer

Commissioner of Patents and Trademarks